(12) United States Patent
Vogelgesang

(10) Patent No.: US 6,619,851 B2
(45) Date of Patent: Sep. 16, 2003

(54) ROLLING ELEMENT BEARING HAVING SEPARATE LUBRICANT FEEDS FOR ROLLING ELEMENTS AND ANTECHAMBER

(75) Inventor: Claus-Joseph Vogelgesang, Mandelbachtal (DE)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 10/108,914

(22) Filed: Mar. 28, 2002

(65) Prior Publication Data

US 2002/0150317 A1 Oct. 17, 2002

(30) Foreign Application Priority Data

Mar. 28, 2001 (DE) .......................................... 101 15 331

(51) Int. Cl.[7] .............................................. F16C 33/72
(52) U.S. Cl. ........................ 384/475; 384/478; 384/486; 384/488

(58) Field of Search ................................. 384/475, 478, 384/488, 484, 474

(56) References Cited

FOREIGN PATENT DOCUMENTS

| DE | 121 704 | 8/1976 |
|----|---------|--------|
| DE | 35 16 131 | 11/1986 |
| FR | 2 774 438 | 8/1999 |
| NL | 32 351 C | 3/1934 |

*Primary Examiner*—Lenard A Footland

(57) ABSTRACT

The invention pertains to a rolling element bearing for a product conveyor and/or product processing element of a harvesting machine, with the bearing including a rolling element chamber and an antechamber, that protects the rolling elements from the penetration of plant juices. A first lubricant feed is provided for supplying lubricant to the rolling elements and a separate second lubricant feed is provided for supplying lubricant to the antechamber.

3 Claims, 2 Drawing Sheets

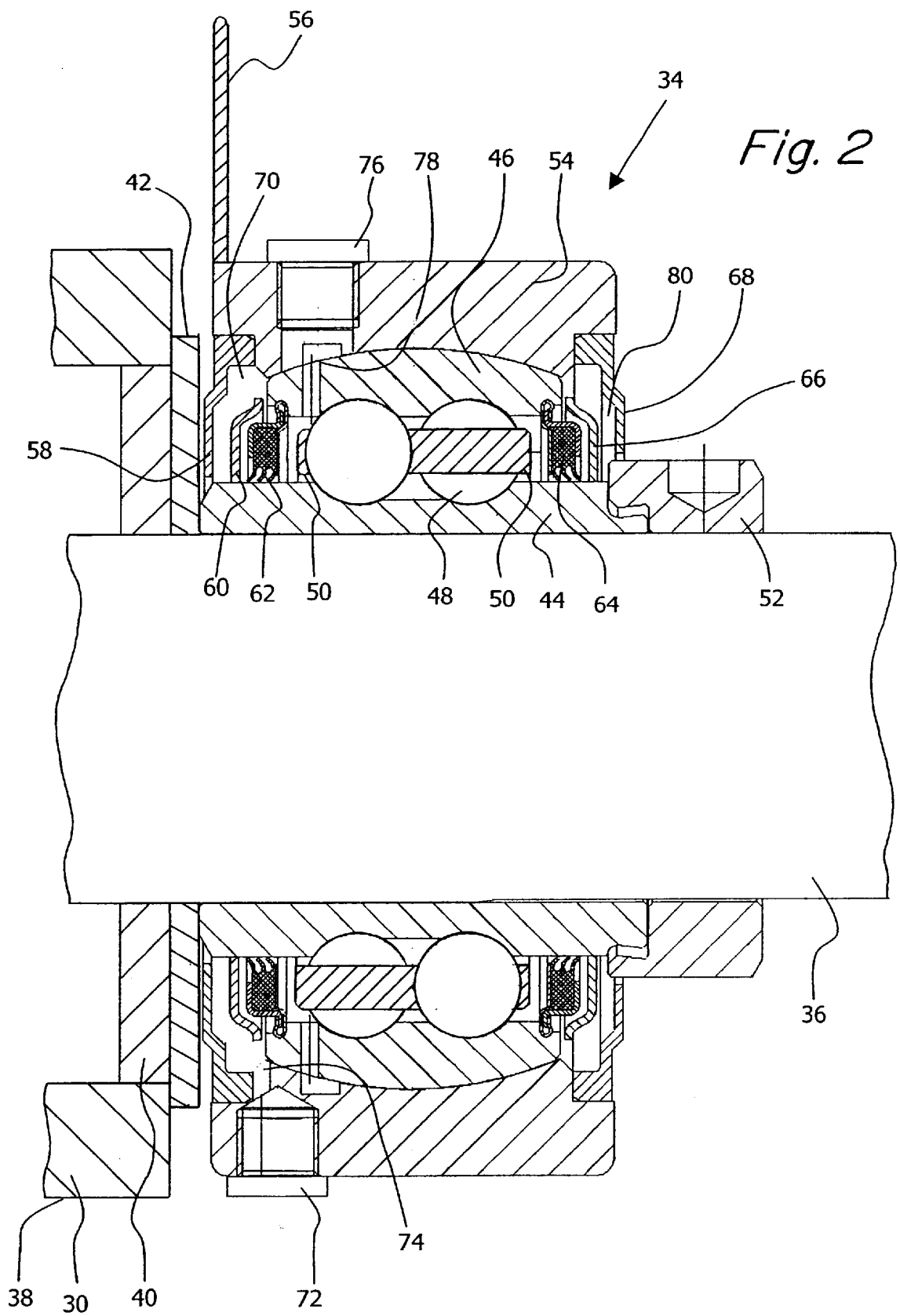

ROLLING ELEMENT BEARING HAVING SEPARATE LUBRICANT FEEDS FOR ROLLING ELEMENTS AND ANTECHAMBER

FIELD OF THE INVENTION

The present invention relates to rolling element bearings, and more particularly relates to a seal and lubricating arrangement for such bearings.

BACKGROUND OF THE INVENTION

A conveyor roller of a field chopper is described in document DD 121 704 in which several grease chambers are located in front of a bearing in the direction of the conveyor roller, with the bearing being in the form of an adjusting-ring bearing. The grease chambers are used to protect the adjusting-ring bearing against penetration of plant juices that can cause corrosion and destruction of the adjusting-ring bearing. The single grease feed is connected with the central lubricant feed and supplies the adjusting ring bearing with grease that also moves from the adjusting-ring bearing through seals into the grease chamber. In this regard, it is considered to be a disadvantage that the adjusting-ring bearing has to be supplied with a relatively high lubricant pressure so that the grease chamber will be supplied with enough grease. Thus, high grease consumption will result, and the adjusting-ring bearing can be damaged by excessive grease pressure or excessive lubricant.

SUMMARY OF THE INVENTION

According to the present invention, there is provided an improved bearing arrangement for use in a corrosive environment such as that of product conveying and/or product processing elements of a crop harvesting machine.

A primary object of the invention is to provide a rolling element bearing constructed such that satisfactory lubrication of the antechamber is possible without excessive lubrication of the rolling elements.

A more specific object of the invention is to provide an improved rolling element bearing having an antechamber protecting the rolling elements against penetration of corrosive fluid, such as plant juices, wherein the antechamber is connected with a first lubricant feed, and the chamber containing the rolling elements is connected with a second lubricant feed. In this manner, the antechamber and the rolling elements, which may be ball bearings, tapered roller bearings or needle bearings, can be separately supplied with lubricant (usually grease). It would also be possible to use sliding bearing elements instead of the rolling bearing elements.

Another object of the invention is to provide a rolling bearing, as set forth in one or more previous objects, wherein the antechamber is connected to the first lubricant feed via a first duct, while the chamber containing the rolling elements is connected to the second lubricant feed via a second duct having no direct connection with the first duct.

These and other objects of the invention will become apparent from a reading of the ensuing description together with the appended drawings.

BRIEF DESCRIPTION OF THE DRAWINGS

FIG. 2 is a cross section of a bearing constructed according to the present invention.

DESCRIPTION OF THE PREFERRED EMBODIMENT

Figure 1:
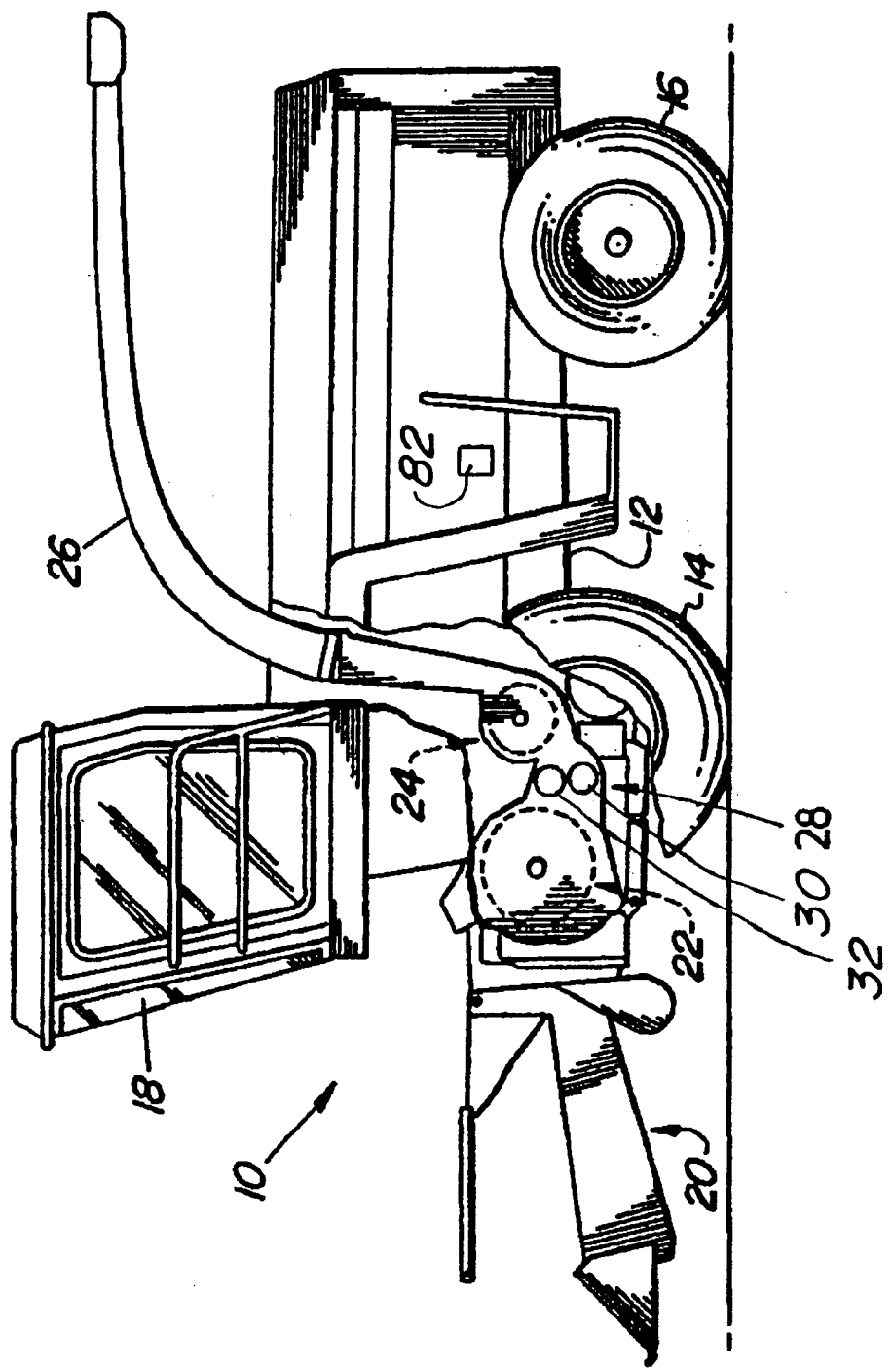
FIG. 1 is a schematic, left side elevational view of a harvesting machine that is representative of the machines with which the present invention is particularly adapted for use.

A harvesting machine 10, shown in FIG. 1, as a kind of self-propelled field chopper, is constructed on a chassis 12 that is supported by front and rear pairs of wheels 14 and 16. Operation of the harvesting machine 10 is done from the operator's cab 18, where a crop pickup device 20, in the form of a corn harvester, is visible. By using the crop pickup device 20, the product picked up from the ground, e.g., corn, grass or the like, is sent to a chopper drum 22 that chops it into small pieces and moves it to a conveyor device 24. The product leaves the harvesting machine 10 and passes by means of a rotatable delivery chute 26 to a trailer moving alongside. Between the chopper drum 22 and the conveyor device 24 there is a kernel processor or after-crusher device 28 by means of which the product to be conveyed is supplied tangentially to the conveyor device 24. The after-crusher device 28 has lower and upper rollers 30 and 32, respectively, which are rotating in mutually opposing directions.

One potential problem of the after-crusher device 28 and also of the other product conveyor and/or product processing elements of the harvesting machine 10, for example, the conveyor device 24 and the intake rollers (not shown) that are located ahead of, and deliver a crop mat to, the chopper drum 22, is that during conveyance or processing of the crop, plant juices are produced that get into the bearings of the product conveyor and/or product processing elements and can destroy them due to corrosion.

In order to prevent the penetration of plant juices into the bearing rollers, opposite ends of the lower roller 30 of the after-crusher device 28 are each equipped with a bearing 34 that is illustrated in detail in FIG. 2. Also, the upper roller 32 can be equipped with a bearing 34 of this kind.

The roller 30 features a hollow cylindrical casing 38 into which an end support ring 40 is inserted. The support ring 40 supports a stub shaft 36. Between the support ring 40 and the bearing 34 there is a support ring 42 arranged on the stub shaft 36 that is intended to protect the bearing 34 from plant juices. The bearing 34 features an inner ball race 44 that is seated on the stub shaft 36, and an outer ball race 46 that surrounds the inner ball race 44. Between the inner ball race 44 and the outer ball race 46 are two rows of balls 48 designed as rolling bearings, with each row of balls being held in a cage 50 and roll in corresponding, opposed sets of axially spaced, curved rolling tracks. The inner ball race 44 is secured to the stub shaft 36 by a clamping ring 52. The clamping ring 52, or the part of the stub shaft 36 extending out beyond it to the right in the figure, can also be used for attachment of a belt pulley or of another kind of drive device. The outer ball race 46 is surrounded radially by a bearing housing 54, which in turn is attached to a side wall 56 of the product conveyor duct of the harvesting machine 10.

Between the bearing housing 54 and the inner ball race 44 there is a first seal 58, in the form of a ring that is connected to the bearing housing 54 and extends radially inward almost to the exterior of the inner ball race 44. A second seal 60 in the form of a ring extending radially outward from the inner ball race 44, whose outer region curves axially away from the roller 30, is spaced axially outward farther from the roller than the first seal 58. The first seal 58 and the second seal 60 form a labyrinth seal. A third seal 62 with flexible lips 62 resting against the inner ball race 44 in turn is farther from the roller 30 than the second seal 60 and is joined to the outer ball race 46. The three seals 58, 60, 62 prevent plant juices from reaching the bearing balls 48. On the opposite side of the bearing 34 from the roller 30, there are three additional seals 64, 66, 68 that are essentially symmetrical with the three seals 58, 60, 62. The outer seal 68, however, is located opposite the clamping ring 52.

Between the first seal 58, the second seal 60 and the third seal 62 there is an annular antechamber 70 that is supplied with grease via a first lubricant feed 72 that is coupled to the antechamber 70 by a duct 74 passing radially through the bearing housing 54. The balls 48 are supplied with grease via a second lubricant feed 76 coupled to a duct 78 passing radially through the bearing housing 54. Also, an annular outer antechamber 80 between the three seals 64, 66 and 68 is supplied with grease via the second duct 78, passing through the space between the balls 48 and under the flexible lips of the outer seal 64. The separate lubricant feeds 72 and 76 make it possible to supply the antechamber 70 and the balls 48 with grease separately, so that the supplied quantities of grease can be measured out according to the particular requirements. The amount of grease can be specified by means of the time interval between lubrications, or by the particular amount of grease supplied. Thus, the antechamber 70 can be supplied with a relatively large amount of grease to compensate for the spent, old grease that is forced out of the antechamber 70 along with the plant juices, whereas the balls 48 receive relatively little grease and at a lower pressure, which will extend their service life. The lubricant feeds 72, 76 are preferably connected with a central lubricant supply 82 of the harvesting machine 10.

It should be mentioned also that the outer antechamber 80 could be supplied with grease from an associated third lubricant feed and a corresponding separate duct. The lubricant feeds 72 and 76 need not be located diametrically opposite each other, as shown in the figure, but rather can be angularly offset from each other by just a few degrees.

Having described the preferred embodiment, it will become apparent that various modifications can be made without departing from the scope of the invention as defined in the accompanying claims.

What is claimed is:

1. A rolling element bearing adapted for use in rotatably supporting a shaft of a crop product conveyor or processing element, comprising: an inner race; an outer race; a housing containing said outer race; said inner and outer races cooperating to define a rolling element chamber between them; rolling elements located in said rolling element chamber; a first pair of seal members being respectively located adjacent axially opposite ends of said outer race and extending to said inner race so as to enclose said rolling element chamber; a second pair of seal members respectively located adjacent opposite ends of said housing in axially spaced relationship to said first pair of seal members; said second pair of seal members extending between said housing and said inner race and cooperating with said first pair of seal members to define first and second antechambers; a first lubricant feed device being connected in fluid communication with one of said first and second antechambers, and a second lubricant feed device being connected in fluid communication with said rolling element chamber, whereby lubricant may be independently supplied to said one of said first and second antechambers and to said rolling element chamber.

2. The bearing, as defined in claim 1, wherein said first and second lubricant feed devices are not in direct fluid communication with each other.

3. The bearing, as defined in claim 1, wherein said first pair of seal members include flexible radially inner lips engaged with said inner race, with the respective lips of the pair of seals being flexed axially away from each other, whereby lubricant may pass from said rolling element chamber to another of said first and second antechambers.

* * * * *